E. A. LE BEAU.
ADJUSTABLE BRAKE HEAD.
APPLICATION FILED JAN. 12, 1910.
990,888.
Patented May 2, 1911.
2 SHEETS—SHEET 2.
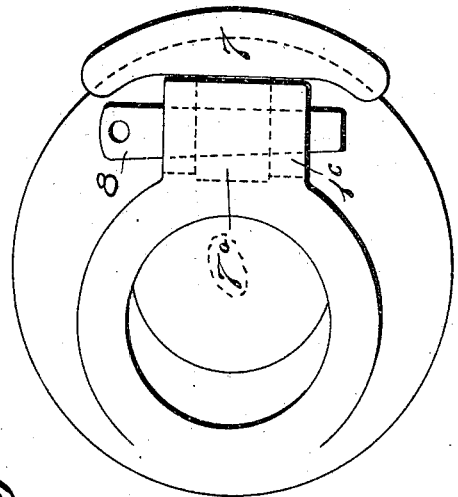
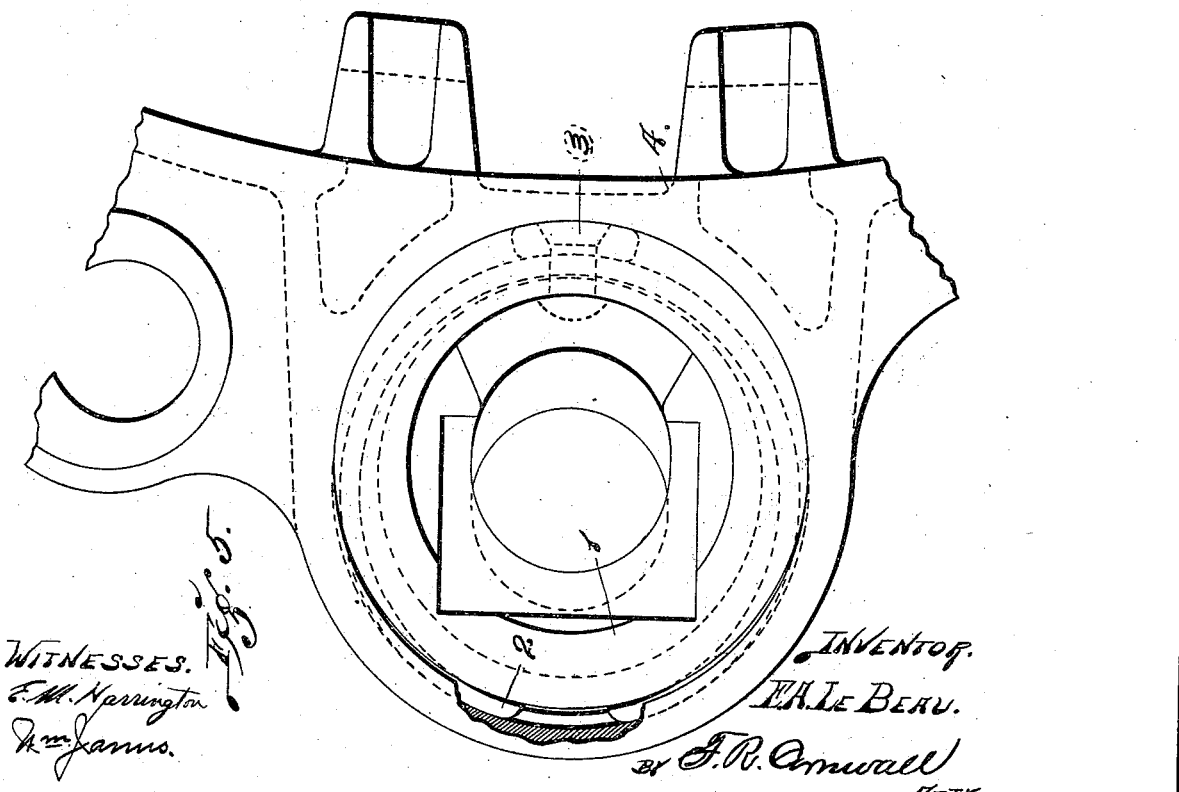

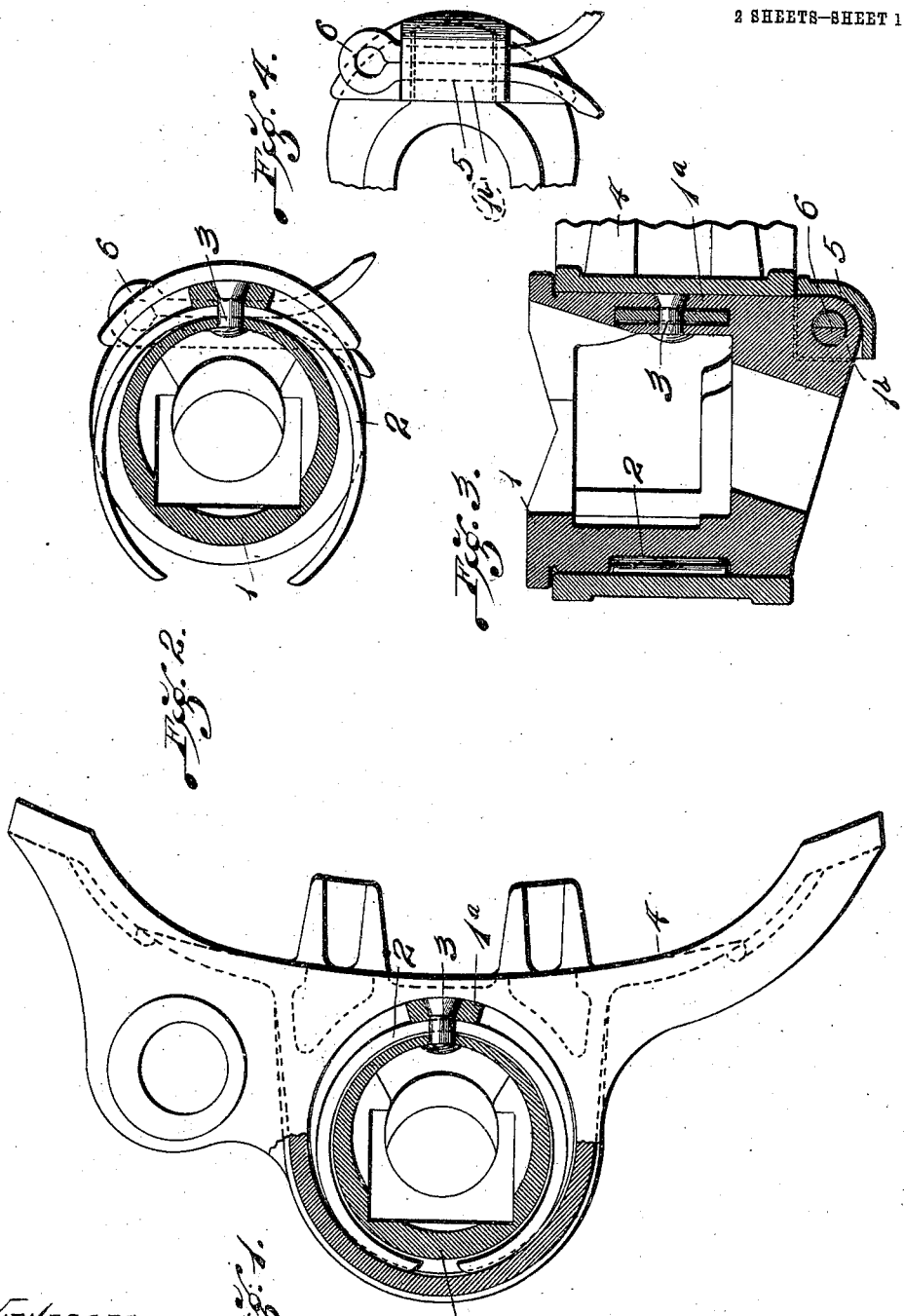

UNITED STATES PATENT OFFICE.

ERNEST A. LE BEAU, OF CHICAGO, ILLINOIS, ASSIGNOR TO CHICAGO RAILWAY EQUIPMENT COMPANY, OF CHICAGO, ILLINOIS, A CORPORATION OF ILLINOIS.

ADJUSTABLE BRAKE-HEAD.

990,888. Specification of Letters Patent. Patented May 2, 1911.

Application filed January 12, 1910. Serial No. 537,748.

*To all whom it may concern:*

Be it known that I, ERNEST A. LE BEAU, a citizen of the United States, residing at Chicago, Illinois, have invented a certain new and useful Improvement in Adjustable Brake-Heads, of which the following is a full, clear, and exact description, such as will enable others skilled in the art to which it appertains to make and use the same, reference being had to the accompanying drawings, forming part of this specification, in which—

Figure 1 is an elevational view of my improved brake head, partly in section. Fig. 2 is a sectional view through the sleeve or part of the brake beam on which the head is mounted. Fig. 3 is a longitudinal sectional view through said sleeve. Fig. 4 is a detail view of one means of holding the brake head in position. Fig. 5 is an elevational view of a modified form of head. Fig. 6 is a modified form of head-retaining device.

This invention relates to a new and useful improvement in brake heads, the object being to provide simple and efficient means whereby the head may be retained in adjusted positions.

Heretofore, the type of adjustable brake heads which has been most extensively used has been provided with a spring-pressed locking block having serrations on its inner face to coöperate with the serrated bottom wall of the thrust block or sleeve. When the brakes are applied, the head adjusts itself to the contour of the wheel and the yielding locking-block permits the serrations to ride over each other. Should the operation of the brakes cause the head to adjust itself slightly when power is applied thereto, causing a slight movement less than the width of a serration, it is obvious that this motion will produce wear between the parts, and eventually the brake head will work loose.

One of the objects of my invention is to provide yielding means frictionally in engagement with the brake head, whereby said brake head may be adjusted to any desired position and held against movement. These friction faces are perfectly plain, but they may be roughened or provided with serrations if desired.

Another object of my invention is to arrange means on the thrust-block, or part of the brake beam on which the head is mounted for taking up wear of the head, said means being also utilized, if desired, to prevent longitudinal displacement of the head.

Another object of my invention is to provide means in the form of a segmental cap to retain the brake head in position on the beam.

In the drawings, 1 indicates the sleeve or thrust-block of a trussed beam, the compression and tension members of which are not shown. This sleeve, or part of the brake beam on which the head is mounted, is preferably circular in form, and is provided at one side, preferably the forward side, with a groove or reduced portion spanned by a bridge piece 1$^a$. In this groove, and under this bridge piece is arranged a leaf-spring 2, which is preferably secured in position by a rivet 3. This leaf-spring is C-shaped, and may have its ends project outwardly beyond the periphery of the part 1, as shown in Fig. 5, the groove in which it is seated, disappearing at the rear face of the part 1; or the rear face of part 1 may be grooved as shown in Fig. 1, in which event the free ends of the leaf-spring 2 may be folded therein, and within the peripheral lines of the part 1, as shown. When expanded, the ends of the spring project beyond the periphery of the part 1, as shown in Fig. 2. To place the brake head in position, the ends of the spring 2 are folded in, and the brake head slipped thereover, as shown in Fig. 3. The brake head 4, shown in Fig. 3 has the interior face of the socket smooth so that it may be readily slipped into and out of position, it being only necessary to overcome the friction of spring 2 in this movement.

To hold a brake head in position, I provide a cap piece 5, which as shown in Figs. 3 and 4, is provided with a recess to receive a lug 1$^b$ on the part 1, through which cap piece and said lug fastens a cotter pin 6. The cap piece extends laterally beyond the periphery of the part 1, and prevents the displacement of the brake head.

In Fig. 6 I have shown a modified form of cap piece in which the lug 1ᶜ on the part 1 is provided with a recess in which is received a projection 7ᵃ of the cap piece 7. A key or pin 8 is employed to hold the cap piece in position.

My improved construction is very simple and cheap, comprising a few parts which perform the functions hereinbefore described. The C-shaped spring engaging the wall of the socket at two points above and below a horizontal line at the rear, will hold the front face of the part 1 in contact with the front wall of the socket, approximately in the plane of said horizontal line. Thus, the head may be said to have three points of contact with the part on which it is mounted, the expansive action of the ends of the spring tending to crowd the head in close contact with the part 1 at all three points so as to take up wear. There is no clearance space between the head and front face of part 1, and hence no lost motion to be taken up in applying the brakes.

If it is desired to dispense with the cotter pin and cap plate for holding the brake head on the beam, the brake head may be provided with a groove in the rear walls of the socket, as shown in Fig. 5 in which the ends of the spring 2 are received. By turning the head around one-quarter of a revolution, the ends of the spring are forced inwardly and out of the groove in the socket wall, thus enabling the head to be readily removed. Instead of a single leaf-spring secured at its middle, two or more springs may be employed. Indeed, the two ends of spring 2 have separate spring action, as is manifest.

I claim:

1. The combination of an adjustable brake head, a part of the beam on which it is mounted, and an expansible spring encircling said part, and exerting an outward pressure on the brake head at a plurality of points.

2. The combination of a brake head, a part on which the same is mounted, said part having a plurality of outwardly movable yielding portions.

3. The combination of a brake head, a part on which the same is mounted, and an expanding spring carried by said part for frictionally engaging said brake head.

4. The combination of a brake head, a part on which the same is mounted, and a leaf-spring secured to said part, and having its free ends engaging said brake head.

5. The combination of a brake head, having a grooved socket, a part on which said brake head is mounted, and an expanding spring carried by said part, and coöperating with the groove in the socket of the brake head.

6. The combination of a brake head, a part on which the same is mounted, and a spring encircling said part and whose ends operate at angles to each other, so as to give outward pressure on the brake head at a plurality of points.

7. The combination of a brake head, a part on which the same is mounted, and a plurality of curved yielding movable parts encircling said brake beam part, and engaging the head to hold the latter in adjusted position.

8. The combination of a brake head, a part on which the same is mounted, said part being provided with a groove and a leaf-spring secured in said groove, and having its free ends bearing against said brake head.

9. The combination of a brake head, a part on which the same is mounted, said part being provided with a groove a leaf-spring secured in said groove, and having both ends coöperating with said brake head.

10. The combination of a brake head, a part on which the same is mounted, said part having a plurality of movable surfaces capable of being expanded so as to increase the diameter of said part to hold said head in adjusted positions.

11. The combination of a brake head, a part on which the same is mounted, said part having a plurality of movable surfaces operating at angles to each other and capable of being expanded so as to increase the diameter of said part to hold said head in adjusted positions and to force said part against said head.

12. The combination of a brake head having a circular socket, a cylindrical part of a brake beam fitting within said socket, said cylindrical part being capable of having its lateral dimensions enlarged at two points around the cylinder, and means for effecting such enlargement.

13. The combination of a brake head having a circular socket, a cylindrical part of a brake beam fitting within said socket, said cylindrical part being capable of having its lateral dimensions enlarged at two points around the cylinder, and springs for effecting such enlargement.

14. The combination of a part of a brake beam which is designed to receive a brake head, and a leaf-spring secured to one of said parts and operating in a groove in the other.

15. The combination of a part of a brake beam which is designed to receive a brake head, and a leaf-spring secured to one of said parts and operating in a circumferential groove in the other.

16. The combination of a part of a brake beam which is designed to receive a brake head, and a leaf-spring secured at approximately its middle portion thereto, the ends thereof being received in a groove in the brake head.

17. The combination of a part of a brake beam which is designed to receive a brake head, and a C-shaped leaf-spring arranged within a groove in the periphery of said part, and having its ends received in a groove in the brake head.

18. The combination of a part of a brake beam for receiving a brake head, said part having a groove spanned by a bridge piece for the purposes described.

In testimony whereof I hereunto affix my signature in the presence of two witnesses, this 8" day of January, 1910.

ERNEST A. LE BEAU.

Witnesses:
  EDWARD T. WALKER,
  M. F. HUNTOON.

Copies of this patent may be obtained for five cents each, by addressing the "Commissioner of Patents, Washington, D. C."